United States Patent Office 3,015,664
Patented Jan. 2, 1962

3,015,664
PROCESS FOR THE PREPARATION OF ADDITION PRODUCTS OF TERTIARY AMINES WITH DICHLOROMETHYL ETHERS OF DIOLS
Paul Muller, Chantilly, France, assignor to Compagnie Francaise des Matieres Colorantes, Paris, France, a company of France
No Drawing. Filed Nov. 10, 1959, Ser. No. 851,972
Claims priority, application France July 21, 1959
3 Claims. (Cl. 260—296)

The present invention concerns a process for the preparation of addition products of tertiary amines with dichloromethyl ethers of diols.

It is known that dichloromethyl ethers of diols are capable of adding pyridine to form the corresponding di-salts; for example, the dichloromethyl ether of 1,2-ethanediol gives the compound of formula:

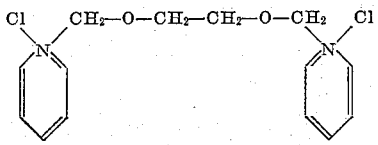

The known processes for the preparation of compounds of this kind are difficult to translate to the industrial scale.

The reaction in question is in fact strongly exothermic and if the pyridine is allowed to flow into the dichloromethyl ether of the diol in a thin film, the reaction product first appears in a rubbery form which sticks to the wall of the reaction apparatus. This phenomenon makes it difficult to remove the heat. The same thing happens if, on the contrary, the dichloromethyl ether of the diol is run into the pyridine. If benzene is used as the reaction medium for the reaction of a tertiary base with a commercial product resulting from dichloromethylation of a diol, the heat formed during the reaction can easily be removed but the reaction product precipitates in a gummy condition which makes its filtration difficult. Moreover, after filtration this product remains strongly impregnated with benzene and the elimination of the latter is difficult without heating, even under vacuum, which is a great disadvantage on account of the sensitivity of the reaction product to temperature. Ether has also been proposed as the reaction medium, but industrial use of this solvent is attended with grave risks.

According to the present invention, it has now been found that the reaction of addition of tertiary bases to dichloromethyl ethers of diols may be advantageously effected by using acetone or methylethylketone as the reaction medium.

Among the diols capable of being employed as starting material for carrying out the present process may be mentioned, by way of example, 1,2-ethanediol or ethylene glycol, 1,2-propanediol, 1,3-propanediol, 1,2-butanediol, 1,3-butanediol, 1,4-butanediol, 2,3-butanediol, 2,2-dimethylolpropane or neopentyl glycol, and diethylene glycol.

For the preparation of the dichloromethyl derivatives, trioxymethylene and gaseous hydrochloric acid may be reacted with the diol, for example, at temperatures between 0° C. and 50° C. A simple method of separating the dichloromethyl derivative from the water formed during the reaction and from excess hydrochloric acid comprises adding anhydrous calcium chloride to the reaction mass; two layers are formed, the aqueous layer containing the excess hydrochloric acid and the calcium chloride, and the upper layer consisting of the dichloromethyl derivative. The latter may be isolated by simple decantation in a sufficient state of purity for its condensation with the tertiary base in ketonic medium. In fact, one of the advantages of the invention is the discovery that, owing to the use of acetone or methylethylketone as reaction medium, the crude dichloromethyl derivative resulting from the decantation mentioned above may be satisfactorily employed.

In the addition of the tertiary base to the dichloromethyl derivative, the latter may be introduced, for example, progressively into the solution of the tertiary base in the ketone. The temperature may be between 0° C. and 78° C., the boiling point of methylethylketone, but it is often advantageous to maintain the temperature between 20° C. and 60° C. The quaternary di-salt is precipitated in the form of easily filterable white crystals which may be used as such or after drying, for example by passing a stream of warm nitrogen over the filter.

The reason that the quaternary di-salts obtained by the present process are easily filterable is that these di-salts are quite insoluble in acetone and methylethylketone and do not swell in these solvents, this having the additional advantage of increasing the yields.

Examples of tertiary bases which may be employed are pyridine, picolines, trimethylamine, triethylamine or dimethylaniline.

The following examples, in which the parts are parts by weight, do not limit the invention.

*Example 1*

62 parts of 1,2-ethanediol and 60 parts of trioxymethylene are introduced into an enamelled apparatus, then 75 parts of gaseous hydrochloric acid are slowly added with vigorous agitation and with cooling so that a temperature of 25° C. is not exceeded. The trioxymethylene gradually disappears and the mixture becomes fluid. 40 parts of anhydrous calcium chloride are then introduced and agitation is continued until solution is complete, then the product is allowed to settle. The upper layer, consisting of the dichloromethyl derivative, represents 130 parts.

260 parts of acetone and 162 parts of α-picoline are then charged into a second enamelled apparatus provided with a powerful stirrer. The dichloromethyl derivative previously obtained is slowly run in. The speed of introduction and the cooling by circulation of water in the double jacket are adjusted so that 40–45° C. is not exceeded. The quaternary di-salt formed precipitates immediately in the form of fine white crystals which are filtered off in a closed filter. 290 parts of the alpha-picolinium di-salt of the dichloromethyl ether of 1,2-ethanediol are obtained which are dried by passing dry nitrogen at 40° C. over the filter.

*Example 2*

The 130 parts of dichloromethyl ether obtained as indicated in Example 1 are slowly introduced at 40–45° C. into 260 parts of methylethylketone and 130 parts of pyridine. The quaternary di-salt formed is immediately precipitated in the form of fine white crystals which are filtered off in a closed filter. 258 parts of the pyridinium di-salt of the dichloromethyl ether of 1,2-ethanediol are obtained.

*Example 3*

The 130 parts of dichloromethyl ether obtained as indicated in Example 1 are slowly run at 40–45° C. into 260 parts of acetone and 130 parts of pyridine. The quaternary di-salt formed is immediately precipitated in the form of fine white crystals, which are filtered off. 258 parts of the pyridinium di-salt of the dichloromethyl ether of 1,2-ethanediol are obtained which may be used as such or after drying.

*Example 4*

The 130 parts of dichloromethyl ether obtained as indicated in Example 1 are slowly run at 40–45° C. into 260 parts of acetone and 100 parts of trimethylamine. The quaternary di-salt formed is immediately precipitated in the form of fine crystals, which are filtered off. 225 parts of the trimethylammonium di-salt of the dichloromethyl ether of 1,2-ethanediol are obtained.

*Example 5*

The 130 parts of dichloromethyl ether obtained as indicated in Example 1 are slowly run at 40–45° C. into 260 parts of acetone and 167 parts of triethylamine. The quaternary di-salt formed is immediately precipitated in the form of fine crystals, which are filtered off. 294 parts of the triethylammonium di-salt of the dichloromethyl ether of 1,2-ethanediol are obtained.

I claim:

1. A process for the preparation of quaternary di-salts which comprises condensing a diol selected from the group consisting of 1:2-ethanediol, 1:2-propanediol, 1:3-propanediol, 1:2-butanediol, 1:3-butanediol, 1:4-butanediol, 2:3-butanediol, 2:2-dimethylolpropane and diethylene glycol with trioxymethylene and gaseous hydrochloric acid at a temperature between 0° C. and 50° C., adding anhydrous calcium chloride to the reaction mass and permitting the mass to form into two separate layers, removing the lower aqueous layer which is formed, reacting the remaining upper layer with a tertiary base selected from the group consisting of pyridine, picoline, trimethylamine, triethylamine and dimethylaniline at a temperature between 0° C. and 78° C. in the presence of a member selected from the group consisting of acetone and methylethylketone to precipitate the white crystalline quaternary di-salt, and separating by filtration said quaternary di-salt.

2. A process as defined in claim 1 in which the reaction is effected at a temperature between 20° C. and 60° C.

3. A process as defined in claim 1 in which the reaction is effected at a temperature between 40° C. and 45° C.

References Cited in the file of this patent

UNITED STATES PATENTS 2,759,020     Girod _____ Aug. 14, 1956

FOREIGN PATENTS 887,113     France _____ July 26, 1943